UNITED STATES PATENT OFFICE.

WILLIAM H. PERKINS, OF FALL RIVER, MASSACHUSETTS.

IMPROVEMENT IN COMPOSITIONS FOR DRESSING COTTON YARNS.

Specification forming part of Letters Patent No. 195,532, dated September 25, 1877; Reissue No. 7,990, dated December 11, 1877; application filed November 27, 1877.

*To all whom it may concern:*

Be it known that I, WILLIAM H. PERKINS, of Fall River, in the county of Bristol and State of Massachusetts, have invented a new and Improved Composition for Dressing Cotton Yarns, of which the following is a specification:

This invention relates to an improved dressing for cotton yarns, and consists of unslaked lime, sal-soda, soap, and water, and is prepared in the following manner and proportions:

Two and one-half pounds of unslaked lime, two and one-half pounds of sal-soda, one ounce of common soap; and one gallon of boiling water are thoroughly stirred together until the parts are thoroughly mixed. Five gallons of soft water are then added, and the whole left standing for twenty-four hours, when the compound is ready for use. It is applied in the same manner as other dressing, but is considerably cheaper. It imparts a bright and glossy finish to the fabrics dressed therewith, and stands unchangeable in any weather or temperature.

Having thus described my invention, I claim as new and desire to secure by Letters Patent—

The cotton-dressing herein described, composed of unslaked lime, sal-soda, and soap, dissolved in water, substantially in the manner described.

WILLIAM H. PERKINS.

Witnesses:

WALDO REED,

JOHN W. GRENARD.